United States Patent [19]

Ooe et al.

[11] Patent Number: 5,778,445
[45] Date of Patent: Jul. 7, 1998

[54] CONTROL DEVICE FOR SECONDARY STORAGE ASSURING TRANSMISSION BANDWIDTH

[75] Inventors: Kazuichi Ooe; Satoshi Inano, both of Kawasaki, Japan

[73] Assignee: Fujitsu Limited, Kawasaki, Japan

[21] Appl. No.: 543,072

[22] Filed: Oct. 13, 1995

[30] Foreign Application Priority Data

Feb. 21, 1995 [JP] Japan ................................. 7-032598

[51] Int. Cl.$^6$ ................................................. G06F 13/16
[52] U.S. Cl. ........................ 711/167; 395/845; 395/826
[58] Field of Search ........................... 395/494, 821,
395/557, 559, 440, 441, 672, 677, 826,
845, 848, 859, 860; 711/494, 112, 157,
158, 151, 167

[56] References Cited

U.S. PATENT DOCUMENTS

| | | |
|---|---|---|
| 5,280,587 | 1/1994 | Shimodaira et al. ................. 395/821 |
| 5,461,611 | 10/1995 | Drake, Jr. et al. ................. 370/54 |
| 5,581,703 | 12/1996 | Baugher et al. ................. 395/200.06 |
| 5,598,395 | 1/1997 | Watanabe ................. 369/116 |
| 5,630,112 | 5/1997 | Yoshida et al. ................. 395/556 |

Primary Examiner—Eddie P. Chan
Assistant Examiner—Hiep T. Nguyen
Attorney, Agent, or Firm—Armstrong, Westerman, Hattori, McLeland, & Naughton

[57] ABSTRACT

In a memory, a program for internal control such as temperature compensation and calibration of a disk device and a program for scheduling the transfer timing and transfer size and effecting the control of data stream transfer between a computer and the disk device according to the scheduling are stored as firmware. A CPU controls a timer interrupting section, disk interface driver and internal interface driver according to the program to attain the internal control of the disk device and data transfer between the computer and the disk device. The timer interrupting section permits data transfer according to the scheduling by previously setting the interrupting timing by the CPU and generating an interruption according to the thus set timing.

16 Claims, 17 Drawing Sheets

FIG. 5

| REQUEST |
| --- |
| INSTRUCTION |
| TRANSFER INTERVAL |
| PERMISSIBLE TRANSFER ERROR |
| TRANSFER STARTING TIME |
| PRIORITY |
| DISK ADDRESS 0 |
| SIZE 0 |
| MEMORY ADDRESS 0 |
| ⋮ |
| DISK ADDRESS N |
| SIZE N |
| MEMORY ADDRESS N |

FIG. 6

| ACK |
| --- |
| AD |

FIG. 7

| DATA |
|------|
| EOF |
| AD |
| DATA |

EOF=1 → LAST DATA TRANSFER

FIG. 8

| SEND OP |
|---------|
| STAT |
| AD |
| TRANSFER INTERVAL |
| PERMISSIBLE TRANSFER ERROR |
| TRANSFER STARTING TIME |
| PRIORITY |
| DISK ADDRESS 0 |
| SIZE 0 |
| MEMORY ADDRESS 0 |
| ⋮ |
| DISK ADDRESS N |
| SIZE N |
| MEMORY ADDRESS N |

CONTROL DEVICE FOR SECONDARY STORAGE ASSURING TRANSMISSION BANDWIDTH

BACKGROUND OF THE INVENTION

1. Field of the Invention

This invention relates to a control device for a secondary storage such as a magnetic disk device for constructing a file system, and more particularly to a control device for a secondary storage which is suitable for controlling a secondary storage as a file system for a multimedia system in which the real-time processing is required at the time of access.

2. Description of the Related Art

In recent years, much attention has been given to a system dealing with multimedia including not only characters and numeral data but also various media such as audio and video data as media for transfer and processing. Therefore, it is frequently required to extend the conventional system which deals with only characters, numerals and the like to a system which deals with the above-described multimedia so as to attain a multimedia system. Generally, the real-time processing is more strongly required in the case of dealing with multimedia than in the case of dealing with only the characters, numerals and the like. That is, if the data stream for reproduction is interrupted in the case of video or audio data processing, the video image of the motion picture is temporarily stopped or the reproduced sound is interrupted, thereby making it impossible to determine the data. Therefore, in the system for dealing with the video or audio data, it is necessary to process or transfer a series of video or audio data items without interruption on the real-time basis.

A method of forming a file system storing a data file therein and reading/writing the data file into a multimedia system is specifically studied. In the case of file system, it is only necessary to give assurance for band width in the transfer of data stream of the file at the time of file reading/writing in order to extend the conventional file system to a system capable of dealing with multimedia.

In order to provide the assurance for band width, periodic scheduling of file server, precise prediction of the access time of the secondary storage, or the band width assurance in the network becomes necessary.

Among them, the precise prediction of the access time in the secondary storage will be influenced by complicated factors such as the number of seeks, rotation waiting time, hit/unhit of the cache in the disk device, calibration (position setting of the disk head) control, and competition between the disks at the time of connection of a plurality of disks if the device, that is, the secondary storage is formed as a hard disk device, for example.

As described above, in order to provide the band width assurance when the file system is formed into a system capable of dealing with multimedia, it becomes necessary to effect the periodical scheduling of the file server, precisely predict the access time of the secondary storage, or assure the band width in the network. In order to precisely predict the access time of the secondary storage, for example, in the case of hard disk device, complicated factors such as the number of seeks, rotation waiting time, hit/unhit of the cache in the disk device, calibration (position setting of the disk head) control, and competition between the disks at the time of connection of a plurality of disks must be taken into consideration. Therefore, it is difficult to set the deadline of the access time.

SUMMARY OF THE INVENTION

An object of this invention is to provide a control device for a secondary storage capable of setting the deadline of the access time of the secondary storage and providing the band width assurance.

A control device for a secondary storage according to a first aspect of this invention comprises a condition setting section for setting the transfer timing and transfer size of data stream in data transfer prior to the data transfer when the data transfer between an initiator and the secondary storage is requested from the initiator; and a data transferring section for effecting the data transfer between the initiator and the secondary storage according to the transfer timing and transfer size of the data stream set by the condition setting section and effecting the operation of reading/writing data of the secondary storage.

The condition setting section may include a condition controlling section for setting the transfer timing and transfer size of the data stream in the data transfer based on the transfer condition given from the initiator.

The condition setting section may set the transfer stream size and transfer interval for one transfer cycle to intermittently transfer the data stream.

The condition setting section may effect the scheduling for the transfer timings and transfer sizes of a plurality of data streams.

The condition setting section may include a condition controlling section for setting the transfer timing and transfer size of the data stream in each of a plurality of data transfers based on the transfer condition defined by a plurality of transfer requests supplied from the initiator.

The control device for the secondary storage according to this invention may further comprise an informing section for informing the initiator that the transfer band width of the data stream to be transferred cannot be assured when the transfer band width cannot be assured and avoiding the data transfer.

The condition setting section may include a condition controlling section for setting the transfer timing and transfer size of the data stream in the data transfer only for the transfer request for which the transfer band width can be assured based on the transfer condition defined by a plurality of transfer requests supplied from the initiator.

The condition setting section may further include a process controlling section which has an internal process setting section for setting a period in which the internal process of the secondary storage is effected in a period other than the transfer period of the data transfer and which causes the internal process to be effected according to the setting content of the internal process setting section.

The condition setting section may set a transfer period of the data transfer for which the transfer band width is not required to be assured in a period other than the transfer period of the data transfer for which the transfer band width is required to be assured based on the transfer condition given from the initiator.

The secondary storage is a disk device and the internal process set by the internal process setting section may contain at least one of the calibration process for calibration of the disk head position and the temperature compensating process for preventing occurrence of abnormal temperature.

The control device of the secondary storage may be disposed on the secondary storage side.

The control device of the secondary storage may be disposed on the initiator device side.

A control system for a secondary storage according to a second aspect of this invention comprises a plurality of secondary storages; an initiator for making accesses to the plurality of secondary storages; control sections for the secondary storages respectively provided for the secondary storages and each including a condition setting section for setting the transfer timing and transfer size of data stream in data transfer based on the transfer condition given from the initiator prior to the data transfer when the data transfer between the initiator and the secondary storage is requested from the initiator and a data transferring section for effecting the data transfer between the initiator and the secondary storage according to the transfer timing and transfer size of the data stream set by the condition setting section and effecting the operation of reading/writing data of the secondary storage; and a selective connection device disposed between the initiator and the control sections for the plurality of secondary storages, for selectively switching and connecting the control sections for the plurality of secondary storages to the initiator and controlling the selective switching of the control sections for the plurality of secondary storages to satisfy the transfer condition given from the initiator.

The selective connection device may include a band width assuring section for assuring the band width of data transfer between connection ports based on the transfer condition given from the initiator.

The band width assuring section may include a scheduler for controlling the schedule for selective switching of the control sections for the secondary storages based on the transfer condition given from the initiator.

In the control device for the secondary storage according to this invention, at the time of data transfer with respect to the initiator, the transfer condition is set, the transmission request of data stream and control request of the disk are integrally managed, the transfer of data stream is adequately scheduled according to the transfer condition, and the deadline of the data transfer can be assured.

In the control device for the secondary storage according to the first aspect of this invention, the transfer timing and transfer size of data stream are set prior to the data transfer requested from the initiator, the data stream is transferred according to the thus set transfer timing and transfer size to effect the operation of reading/writing data of the secondary storage and the deadline of the data transfer can be assured.

In the control system for the secondary storages according to the second aspect of this invention, in each of the plurality of secondary storages, if data transfer is requested from the initiator, the transfer timing and transfer size of data stream in the data transfer are set based on the transfer condition given from the initiator prior to the data transfer, the data transfer is effected between the initiator and the secondary storages according to the thus set transfer timing and transfer size to effect the operation of reading/writing data of the secondary storage, and in a case where the switching control device for selectively switching and connecting the control sections for the plurality of secondary storages is provided between the initiator and the control sections for the plurality of secondary storages, the deadline of the data transfer can be assured in the switching control device by controlling the selective switching of the control sections for the secondary storages to satisfy the transfer condition given from the initiator in the switching control device.

BRIEF DESCRIPTION OF THE DRAWINGS

Other objects and advantages of the invention will become apparent during the following discussion in conjunction with the accompanying drawings, in which:

FIG. 5 is a diagram for illustrating the content of request information in the control device for the secondary storage shown in FIG. 1;

FIG. 6 is a diagram for illustrating the content of response information in the control device for the secondary storage shown in FIG. 1;

FIG. 7 is a diagram for illustrating the content of data information in the control device for the secondary storage shown in FIG. 1;

FIG. 8 is a diagram for illustrating the content of instruction transmitting information in the control device for the secondary storage shown in FIG. 1;

DETAILED DESCRIPTION OF THE PREFERRED EMBODIMENTS

There will now be described control devices for secondary storages according to the embodiments of this invention with reference to the accompanying drawings.

First Embodiment:

A principle control device for a secondary storage according to the first embodiment of this invention is explained with reference to FIGS. 1 to 19.

Figure 1:
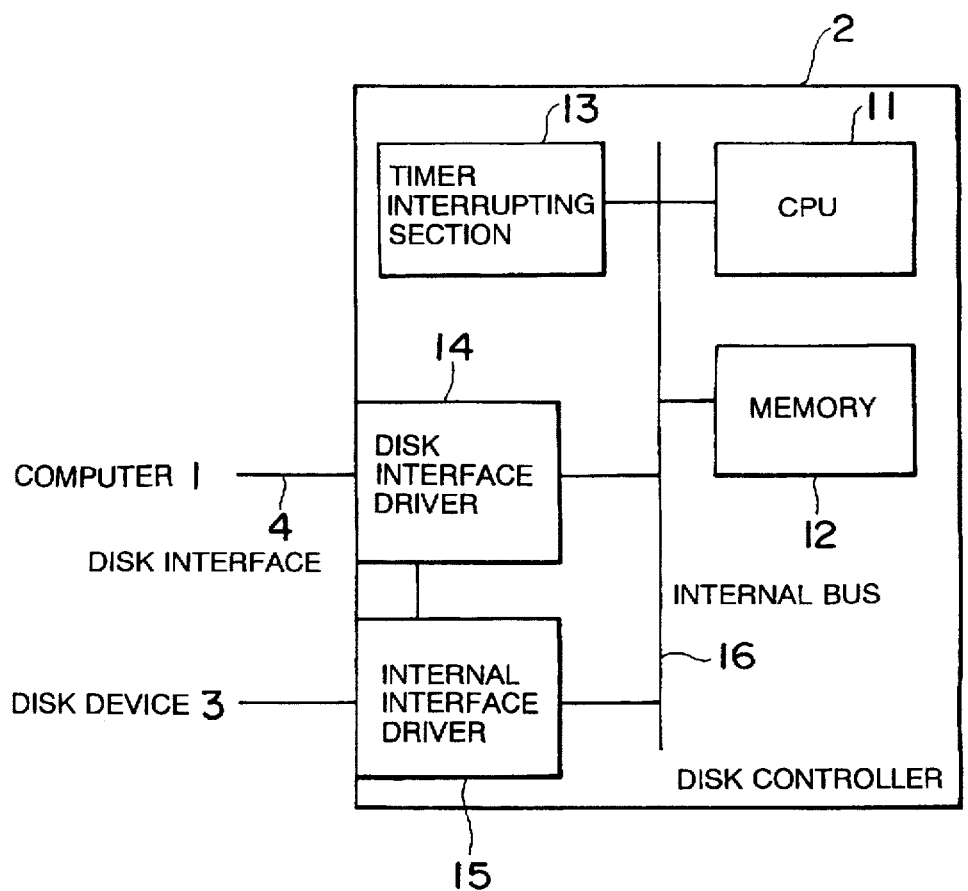
FIG. 1 is a block diagram showing the construction of a control device for a secondary storage according to a first embodiment of this invention.
Figure 2:
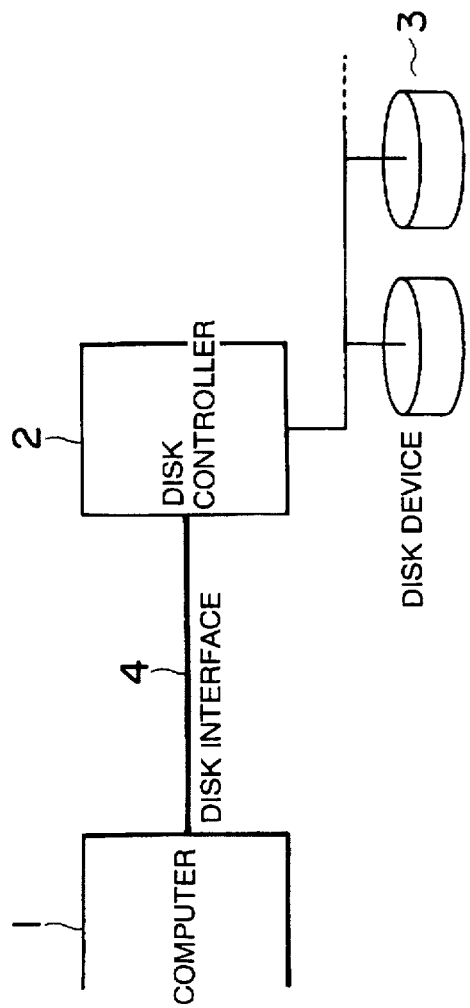
FIG. 2 is a system block diagram showing the construction of a file system using the control device for the secondary storage shown in FIG. 1.

FIG. 1 shows a disk controller to which the control device for the secondary storage according to this invention is applied and the construct ion of a file system using the disk controller is shown in FIG. 2.

The file system of FIG. 2 includes a computer 1, disk controller 2 and disk device 3.

The computer 1 is an initiator for making access to the disk device 3 and effects data transfer with respect to the disk device 3 to effect the reading/writing operation f or the disk device 3.

The disk device 3 is a hard disk device, for example, and can store file data, for example, by writing the file data into a magnetic disk which is a storage medium and read out th e file data from the disk to use the same. The disk device 3 may be sometimes constructed by a plurality of disk device s or disk units.

The disk controller 2 is connected to the disk device 3 and controls the access operation for the reading/writing operation of the disk device 3. In this embodiment, the control device for the secondary storage according to this invention is incorporated in the disk controller 2.

The initiator or the computer 1 is connected to the disk controller 2 via an interface 4 containing a cable to make access to the disk device 3 via the disk controller 2.

The detail of the disk controller 2 is shown in FIG. 1. The disk controller 2 includes a CPU (central processing unit) 11, memory 12, timer interrupting section 13, disk interface driver 14 and internal interface driver 15.

The CPU 11 is formed of a microprocessor, for example, and the disk controller 2 is controlled and operated by the CPU 11.

The memory 12 includes a ROM (read only memory) and a RAM (random access memory) and stores data and a program necessary for the operation of the CPU 11 for controlling the disk device 3. That is, in the ROM, a program for controlling the disk device 3 is stored as firmware and the CPU 11 controls the disk device 3 according to the program. In the RAM, necessary data is stored at adequate timings in accordance with the operation for controlling the disk device 3.

In the ROM, a program for setting the transfer timing and transfer size of data stream in the data transfer at the reading/writing time and a program for permitting the data transfer according to the thus set transfer timing and transfer size of the data stream are also stored as firmware. The CPU 11 sets the transfer timing and transfer size according to the above programs and controls the reading/writing operation of the disk device 3 according to the transfer timing and transfer size. In the RAM, data for the reading/writing process of the disk device 3 according to the transfer timing and transfer size is also stored.

The timer interrupting section 13 generates an interruption to the CPU 11 according to the set transfer timing and effects the timing control for transferring the data stream of preset transfer size.

The memory 12 and timer interrupting section 13 are connected to the CPU 11 via a common internal bus 16.

The disk interface driver 14 is a device driver which is connected to the internal bus 16 and drives the disk interface 4 between it and the computer 1. Communication, for example, data transfer between the disk controller 2 and the computer 1 is effected via the disk interface driver 14 and disk interface 4.

The internal interface driver 15 is a device driver which is connected to the internal bus 16 and drives the disk device 3. Communication, for example, data transfer between the disk controller 2 and the disk device 3 is effected via the internal interface driver 15.

That is, in the ROM of the memory 12, a program for internal control for temperature compensation, calibration of the disk device 3 and a program for scheduling the transfer timing and transfer size and effecting the transfer control of data stream between the computer 1 and the disk device 3 according to the scheduling are stored as firmware. The CPU 11 effects the internal control of the disk device 3 and the data transfer between the computer 1 and the disk device 3 by controlling the timer interrupting section 13, disk interface driver 14 and internal interface driver 15 according to the above programs stored as firmware in the memory 12. The timer interrupting section 13 makes it possible to effect the data transfer according to the scheduling by previously setting the interruption timing by the CPU 11 and generating an interruption according to the thus set timing.

Figure 3:
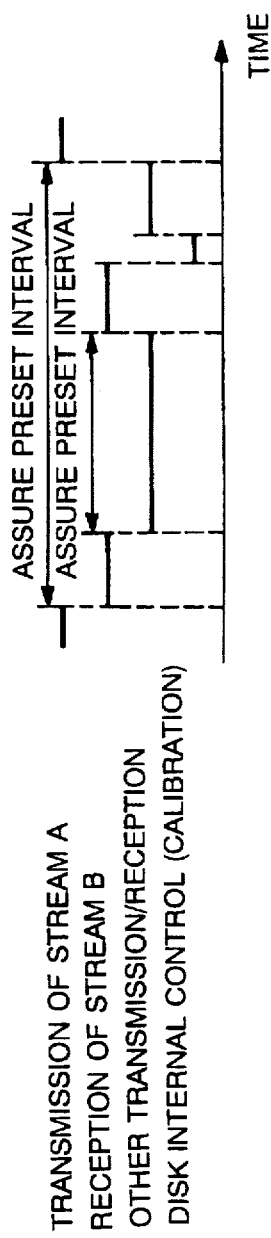
FIG. 3 is a block diagram showing the timing for controlling a disk device in the control device for the secondary storage shown in FIG. 1.

FIG. 3 schematically shows the data transfer timing in the disk controller 2 of the system.

In this case, it is supposed that transmission of the stream A to the computer 1 for reading out and transferring the stream A from the disk device 3 to the computer 1, reception of the stream B from the computer 1 for transferring and writing the stream B from the computer 1 into the disk device, and other transmission/reception with respect to the computer 1 are effected, and a case wherein the above data transmission and reception and the internal control for calibration of the disk device 3 are effected is considered.

It is supposed that, in transmission of the stream A from the disk device 3 to the computer 1 and reception of the stream B from the computer 1 to the disk device 3, the real-time operation is maintained and, for example, it is necessary to assure the deadline (limitation of the transfer rate) of the transfer timing and transfer size according to the transfer condition given from the computer 1 prior to transfer of the stream in order to prevent the associated process such as display process from being influenced. The other transmission and reception are not limited in time and it is satisfactory only if the transmission and reception are effected. Further, the internal control for calibration of the disk device 3 must be effected in substantially a preset period time although it is not strictly required, and in a period in which the internal control is effected, the data transmission and reception cannot be effected.

Therefore, the timings of transmission of the stream A, reception of the stream B, the other transmission and reception and the internal control are set as shown in FIG. 3. Transmission of the stream A is intermittently effected while the transfer interval and the transfer size for one transfer cycle are determined according to the transfer condition of the stream A so as to assure the deadline of the transfer. In this case, the transfer interval of the intermittent transfer in transfer of the stream A is assured when viewed from the exterior.

Likewise, in reception of the stream B, the transfer interval and the transfer size for one transfer cycle are determined according to the transfer condition of the stream B so as to assure the deadline of the transfer. In this case, the transfer interval of the intermittent transfer in transfer of the stream B is assured when viewed from the exterior and the transfer period of the intermittent transfer is determined so as to be set within the transfer interval period of the stream A.

Further, the period for the internal control of calibration and the like is set within a period other than the transfer periods of the stream A and stream B. At this time, the priority (in time) of the timing for setting the period is higher for the transfer period which requires the deadline assurance than for the period of internal control, but the priority of the processing itself is higher for the internal control than for the transfer, and therefore, in a case where it becomes impossible to set the period for the internal control by setting the transfer period of stream which requires the deadline assurance, the transfer is inhibited so as to permit the internal control to be effected. That is, in a case where it becomes impossible to set the period for the internal control if the stream transfer period which requires the deadline assurance is previously set, the stream transfer which requires the deadline assurance is inhibited from being set in order to ensure the period for the internal control before setting the stream transfer period.

Therefore, in a case where transfer of the stream B is requested after transfer of the stream A and it becomes impossible to set the period for the internal control by effecting the transfer of the stream B in the case of FIG. 3, the transfer request of the stream B is rejected. When it is possible to ensure the period for the internal control, the period for the internal control is set within a remaining period (that is, a period in which both of the transfer resting periods of the streams A and B overlap) other than the transfer periods of the streams A and B since the timing for the internal control is not strictly limited. After allotment of the period, the other transmission and reception are allotted in the remaining period.

The CPU 11 sets the timer interrupting section 13 according to the thus scheduled timing and operates the disk controller 2 according to the above timing by use of the timer interruption of the timer interrupting section 13.

The more detail operation of the system is explained below.

Figure 4:
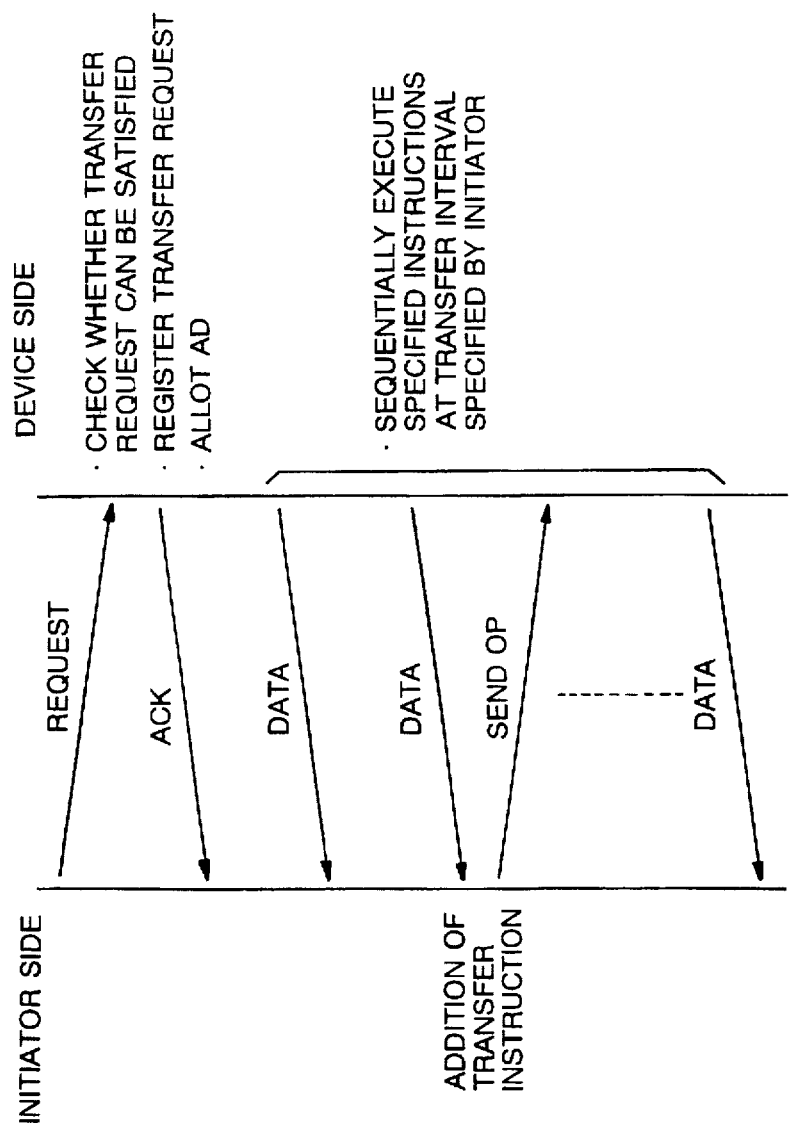
FIG. 4 is a diagram for illustrating the control protocol between the initiator and the device for an instruction required for providing the deadline assurance in the control device for the secondary storage shown in FIG. 1.

In FIG. 4, the outline of the control protocol in the access instruction required for providing the deadline assurance, that is, information transfer between the computer 1 which is an initiator and the disk device 3 which is a device is shown.

(1) Transmit a request from the initiator side to the device side.

As shown in FIG. 5, information attached to the request contains an instruction, transfer interval, permissible transfer error, transfer starting time, priority, disk address, size and initiator side memory address.

The instruction is information indicating the content of a process to be requested, and may be a readout instruction indicating the transfer from the device side to the initiator side, a write instruction indicating the transfer from the initiator side to the device side, for example. The disk address, size and initiator side memory address are respectively a write address, transfer data size of the disk device 3 on the device side and a readout address of the memory in the computer 1 on the initiator side and are set for each data block of the data stream to be transferred.

The transfer interval represents a transfer resting period between instructions. The permissible transfer error indicates an error which can be permitted on the initiator side when the transfer interval cannot be maintained on the device side. The transfer starting time indicates time taken for actually starting the transfer after the device feeds back acknowledgement (ack) and the transfer starting time can be confirmed on the initiator side. The priority indicates the priority of an Access Descriptor (which is hereinafter referred to as "AD") as will be described later and indicates the priority of the ADs.

The disk address, size and initiator side memory address are set for each of the data blocks and the other information is effective unless a request of change is issued from the initiator side. That is, the disk address, size and initiator side memory address are effective for one cycle for each data block and the other information is changed when a request of change is issued from the initiator side and then applied to the transfer effected before it is changed by the next request of change. Therefore, the disk address, size and initiator side memory address are attached for a plurality of data block transfer cycles at the time of request. Further, the disk address, size and initiator side memory address are informed to the device side at adequate time during the data transfer (they are added before an instruction of the instruction queue for execution queuing stored in the disk controller 2 on the device side is used up).

(2) Transmit acknowledgement (ack) from the device side to the initiator side and break the connection between the initiator and the device.

Information attached to the acknowledgement (ack) is an AD described before as shown in FIG. 6.

After this, the initiator transmits a request to the device side by use of the AD.

(3) Transmit an interruption from the device side to the initiator side by the timer interruption and connect them when the specified transfer interval has passed and transfer specified data to the specified initiator side memory address of the initiator side memory.

As shown in FIG. 7, information attached to the data is a flag of an end of file (eof) (eof=1 at the time of transfer of final data of the file and eof=0 at the other time), AD and substance of the data.

(4) Transmit succeeding instruction information from the initiator side by the send operation (send op) before the instruction queue stored in the device side comes to an end.

As shown in FIG. 8, information attached to the send operation (send op) is status information (stat), AD, transfer interval, permissible transfer error, transfer starting time, priority, disk address, size and initiator side memory address. The status information (stat) is used for informing completion of the data transfer or the like, and the status information (stat) may permit the device side to recognize that the previous operation state is maintained or completed. In a case where the transfer interval or the like is changed during the transfer, the transfer interval of the transfer by the send operation (send op) is corrected. The disk address, size and initiator side memory address group is the same as that contained in the request.

Figure 9:
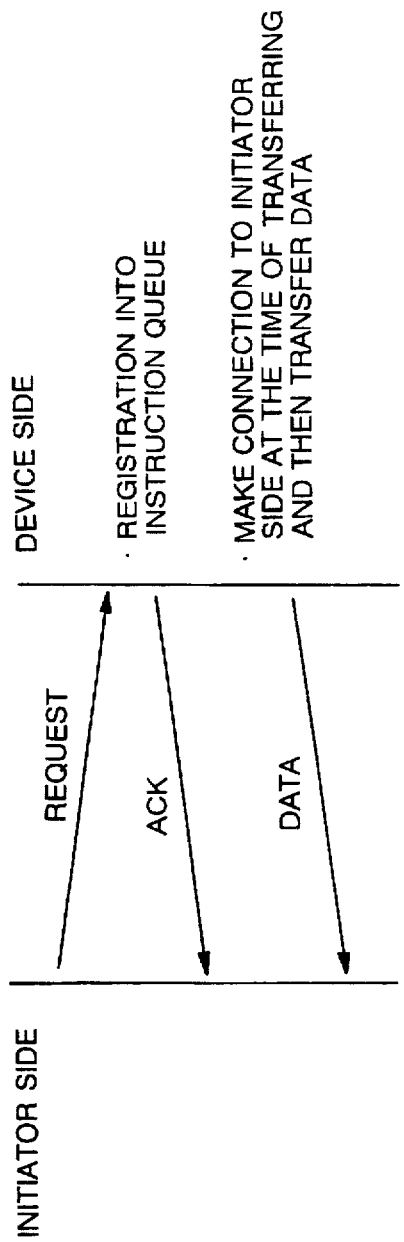
FIG. 9 is a diagram for illustrating the control protocol between the initiator and the device for a normal instruction in the control device for the secondary storage shown in FIG. 1.

FIG. 9 shows the outline of the control protocol in a normal access instruction which is not required for providing the deadline assurance.

(1) Transmit a request from the initiator side to the device side.

In this case, since the transfer condition is not necessary, information contains an instruction, disk address, size and initiator side memory address and corresponds to information obtained by omitting the transfer period, permissible transfer error, transfer starting time, and priority from the information of FIG. 5.

(2) Transmit acknowledgement (ack) from the device side to the initiator side and break the connection between the initiator and the device. At this time, it is not necessary to attach AD to the acknowledgement (ack).

(3) The device side schedules the transfer time (as a process having a lower priority than the other control) together with the other transfer instruction, transmits an interruption to the initiator side and make a connection thereto so as to effect the data transfer when transfer to the initiator becomes possible.

Next, the control inside the disk controller 2 which is a controller provided on the device side in the above protocol is explained with reference to FIG. 10.

(i) Management/control of instruction for assuring the deadline.

For management of the instruction for assuring the deadline, an access descriptor table (which is hereinafter referred to as an AD table) and a timer interruption link are used.

Figure 10:
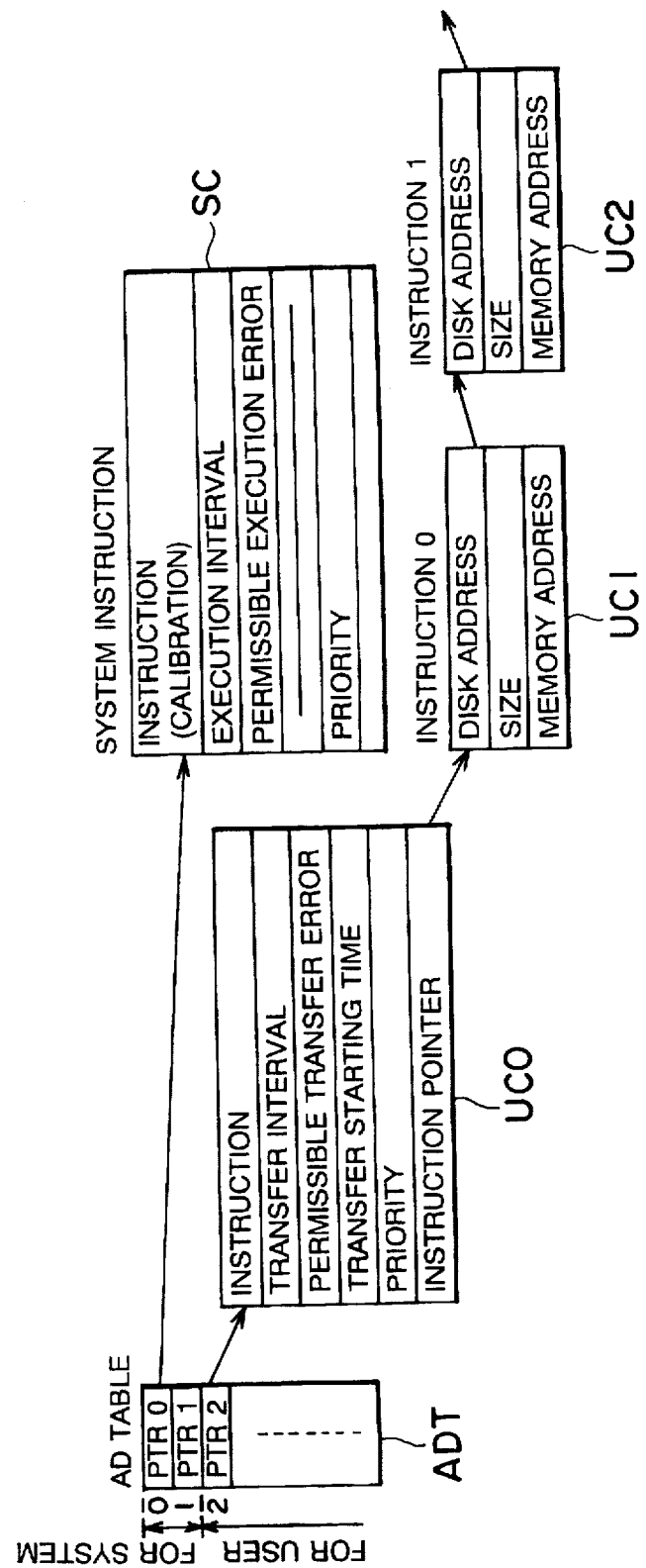
FIG. 10 is a schematic diagram for illustrating the instruction management for an instruction required for providing the deadline assurance in the control device for the secondary storage shown in FIG. 1.

As shown in FIG. 10, the first two areas in the AD table ADT are reserved for system. One of the above two areas, for example, the first area "0" is an area in which the pointer 0 (ptr 0) indicating the location in which information of system instruction SC used for control of calibration is stored is stored. In order to manage information containing the transfer interval, instruction corresponding to a series of instructions corresponding to each AD and the like, pointers 2 . . . (ptr 2 . . . ) indicating locations in which the above information items are stored in the user area "2" of the AD table ADT.

The system instruction SC for calibration contains an instruction of calibration, execution interval, permissible execution error, priority and the like. In information UC0 corresponding to an AD indicated by the pointer 2 stored in the user area "2", an instruction, transfer interval, permissible transfer error, transfer starting time, priority and instruction pointer are stored. As the instruction pointer, pointers indicating addresses of locations in which instruction information items UC1, UC2 . . . for transfer by instructions among the series of instructions are stored. In each of the instruction information items UC1, UC2 . . . , a disk address, size and memory address for each transfer block are stored.

Figure 11:
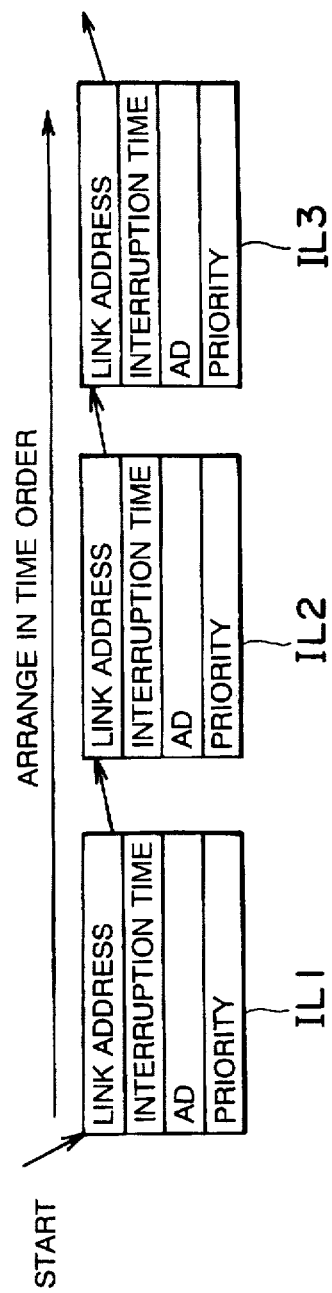
FIG. 11 is a schematic diagram for illustrating the timer interruption link for an instruction required for providing the deadline assurance in the control device for the secondary storage shown in FIG. 1.

The timer interruption link shown in FIG. 11 is used to execute the instruction of each AD in the AD table at adequate timing. Each link information IL1, IL2, IL3, . . . of the timer interruption link is constructed by information of link address, interruption time, AD and priority. In the link address, a storage address of next link information is held, in the interruption time, execution time of a next instruction is held in the form of absolute time of the system, in the AD, a corresponding AD in the AD table shown in FIG. 10 is held, and in the priority, the priority of an instruction corresponding to the AD is held. The links are arranged and connected by the link addresses according to the execution time of instruction to be next executed and expressed by the absolute time of the system in the order of the magnitude thereof. In the hardware of the timer interrupting section 13, only the interruption time of first link information of the link is actually set. If the timer interruption by the timer interrupting section 13 occurs, data transfer based on the AD is effected, the first timer link information is removed, the content of the next timer link information is set into the hardware of the timer interrupting section 13, and the process (of one cycle) based on one timer interruption is completed.

(ii) Management/control of normal instruction.

Figure 12:
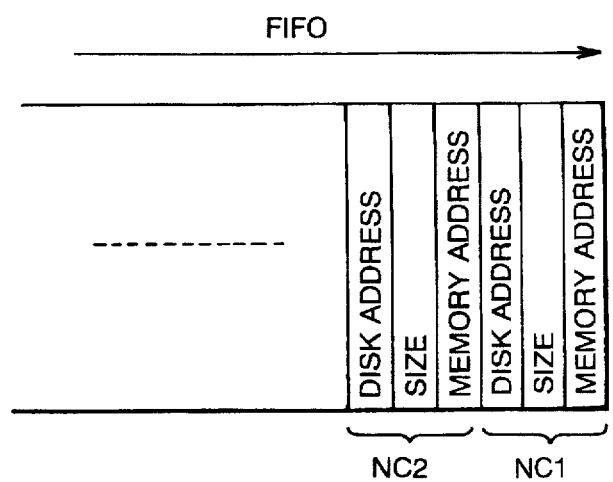
FIG. 12 is a schematic diagram for illustrating the instruction management for a normal instruction in the control device for the secondary storage shown in FIG. 1.

Normal instructions which are not required for assuring the deadline are enqueued into a FIFO (first-in first-out) instruction queue set in the RAM of the memory 12 and sequentially executed. As shown in FIG. 12, the FIFO instruction queue has a disk address, size and memory address for data transfer for each instruction NC1, NC2, . . . The instruction for assuring the deadline has priority over the normal instruction.

Next, the flow of control operation of the disk controller 2 is explained with reference to the flowchart shown in FIGS. 13 to 19.

Figure 13:
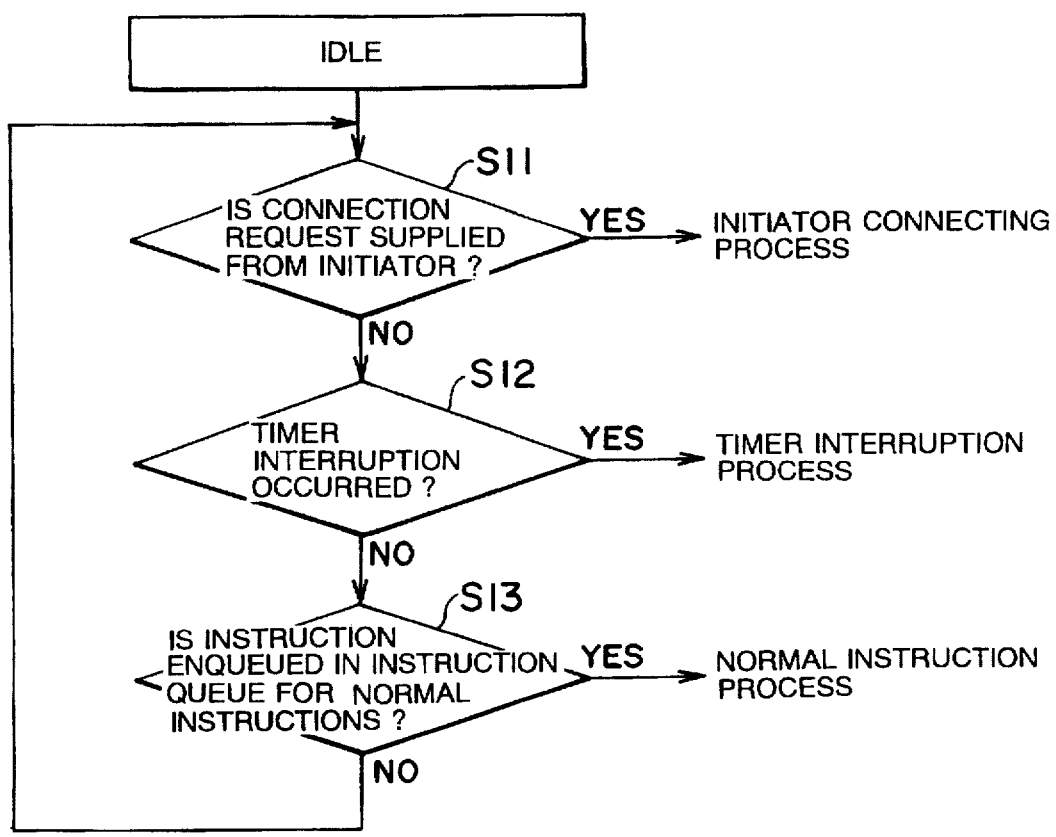
FIG. 13 is a flowchart for illustrating the idle routine of the control in the control device for the secondary storage shown in FIG. 1.

FIG. 13 shows an idle routine in the standby state at normal time. In the idle routine, whether a connection request is supplied from the initiator or not (step S11), whether a timer interruption has occurred or not (step S12), and whether an instruction is enqueued in the instruction queue for normal instructions or not (step S13) are determined.

That is, if it is determined in the step S11 that no connection request is supplied from the initiator, the step S12 is effected, and if it is determined in the step S12 that no timer interruption has occurred, the step S13 is effected, and if it is determined in the step S13 that no instruction is enqueued in the instruction queue for normal instructions, the step S11 is effected again. That is, in the idle routine, if no connection request is supplied from the initiator, no timer interruption has occurred, and no instruction is enqueued in the instruction queue for normal instructions, the determining operations of step S11-step S12-step S13 are sequentially effected and a sequence of determining operations is cyclically effected.

Figure 14:
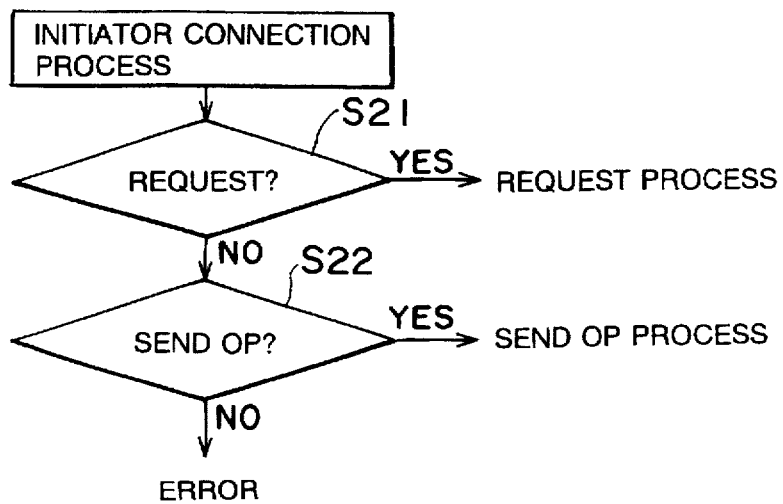
FIG. 14 is a flowchart for illustrating the initiator connection processing routine of the control in the control device for the secondary storage shown in FIG. 1.
Figure 18:
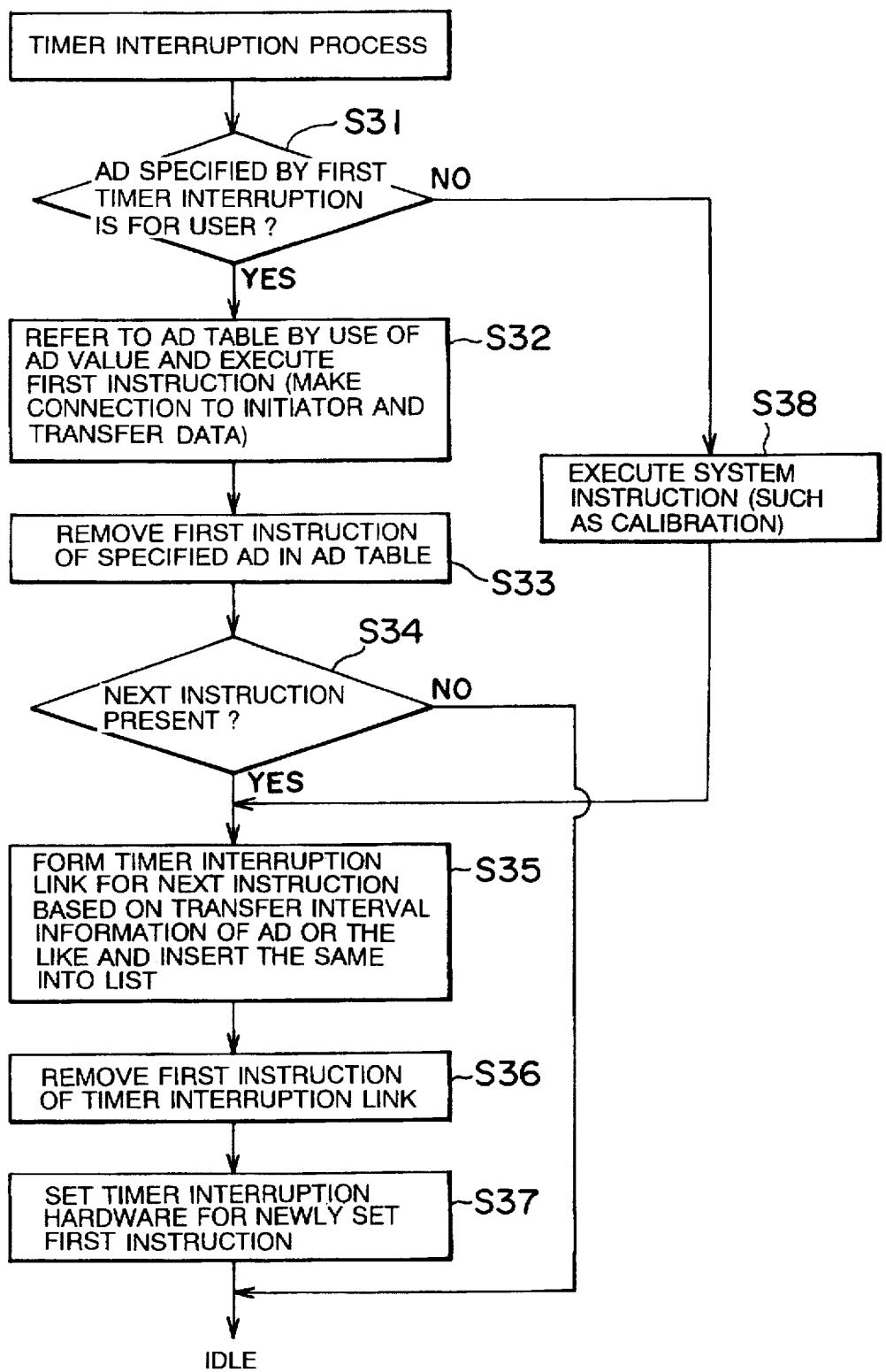
FIG. 18 is a flowchart for illustrating the timer interruption processing routine of the control in the control device for the secondary storage shown in FIG. 1.
Figure 19:
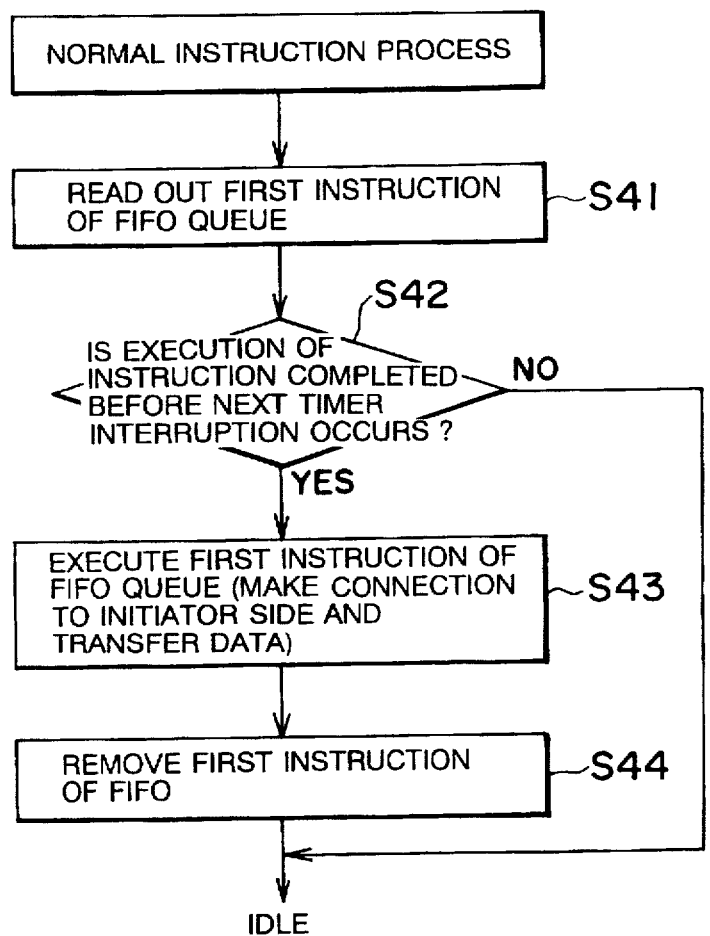
FIG. 19 is a flowchart for illustrating the normal instruction processing routine of the control in the control device for the secondary storage shown in FIG. 1.

If it is determined in the step S11 that a connection request is supplied from the initiator, the initiator connection process shown in FIG. 14 is effected, if it is determined in the step S12 that a timer interruption has occurred, the timer interruption process shown in FIG. 18 is effected, and if it is determined in the step S13 that an instruction is enqueued in the instruction queue for normal instructions, the normal instruction process shown in FIG. 19 is effected.

Figure 15:
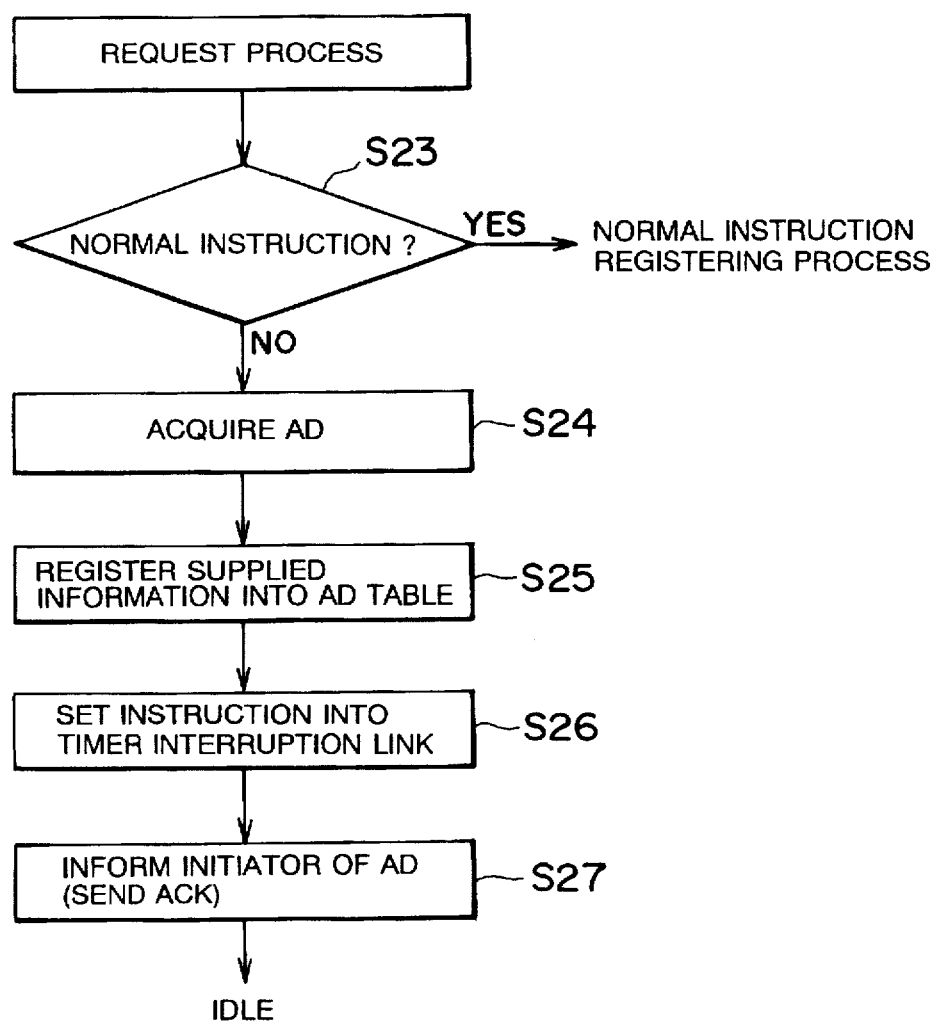
FIG. 15 is a flowchart for illustrating the request processing routine of the control in the control device for the secondary storage shown in FIG. 1.

FIG. 14 shows the initiator connection process. In the initiator connection process, whether the connection request from the initiator is a request or not (step S21) and whether the connection request from the initiator is a send operation (send op) or not (step S22) are determined. If it is determined in the step S21 that the connection request from the initiator is a request, the request process shown in FIG. 15 is effected, and if it is determined in the step S21 that the connection request from the initiator is not a request, the step S22 is effected. If it is determined in the step S22 that the connection request from the initiator is a send operation (send op), the send operation (send op) process shown in FIG. 16 is effected, and if it is determined in the step S22 that the connection request from the initiator is not a send operation (send op), it is determined that an error has occurred and an adequate error process is effected.

Figure 17:
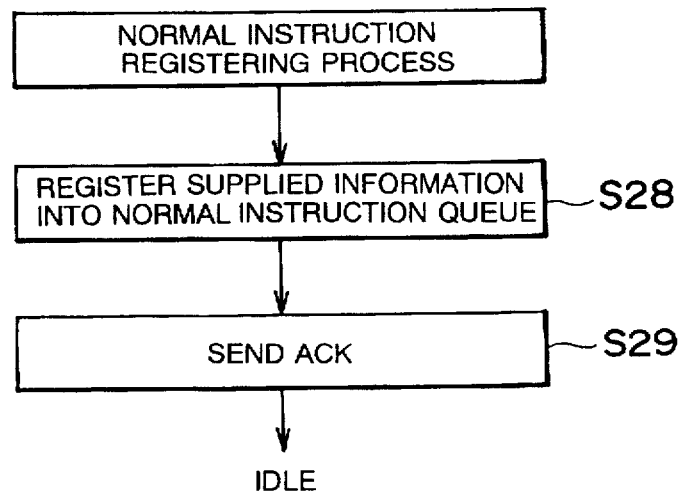
FIG. 17 is a flowchart for illustrating the normal instruction registration processing routine of the control in the control device for the secondary storage shown in FIG. 1.

In the request process in FIG. 15, whether or not it is a normal instruction which is not required for providing the deadline assurance is determined (step S23), and if it is a normal instruction which does not assure the deadline, the normal instruction registering process shown in FIG. 17 is effected. If it is determined in the step S23 that it is not a normal instruction, that is, if it is an instruction for assuring the deadline, an AD is acquired (Step S24) and information supplied from the initiator is registered into the AD table (step S25). Further, a series of instructions based on the information are set in the timer interruption link and a first instruction among them is set in the timer interrupting section 13 (step S26), and the AD is informed to the initiator as acknowledgement (ack) (step S27). After the acknowledgement (ack) is fed back to the initiator in the step S27, the process returns to the idle routine of FIG. 13.

In the normal instruction registering process of FIG. 17 effected when it is determined in the step S23 that the request is a normal instruction, information supplied from the initiator is registered into the normal instruction queue (step S28) and the acknowledgement (ack) is fed back to the initiator (step S29). Also, the process returns to the idle routine of FIG. 13 after the acknowledgement (ack) is fed back to the initiator in the step S29.

Figure 16:
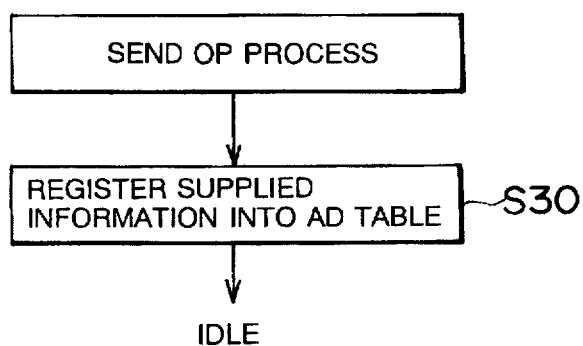
FIG. 16 is a flowchart for illustrating the instruction transmitting processing routine of the control in the control device for the secondary storage shown in FIG. 1.

In the send operation (send op) of FIG. 16, information supplied from the initiator is registered into the AD table (step S30) and then the process returns to the idle routine of FIG. 13.

FIG. 18 shows the timer interruption process. In the timer interruption process, whether or not an AD specified in the first timer interruption process is an AD for user, that is, an AD based on the request from the initiator is determined (step S31), and if it is an AD for user, the AD table is referred to by use of the AD value and a first instruction among the series of instructions indicated by the AD is executed (step S32). In this case, for example, in the step S32, it is connected with the initiator side and the process for transferring data is effected. Next, the first instruction (which has been executed) corresponding to the specified AD in the AD table is removed (step S33) and whether a next instruction is present or not is determined (step S34). If it is determined in the step S34 that a next instruction is present, a timer interruption link for the next instruction is formed based on information such as transfer interval information of the AD and inserted into a timer interruption list (step S35). Then, the first instruction (which has been executed) of the timer interruption link is removed (step S36) and a timer interruption for a newly set first instruction is set in the timer interruption processing section 13 (step S37). After the processing in the step S37, the process returns to the idle routine of FIG. 13.

If it is determined in the step S31 that the specified AD is not an AD for user, a system instruction for calibration, for example, is executed (step S38) and then the step S35 is effected. If it is determined in the step S34 that a next instruction is not present, the process immediately returns to the idle routine of FIG. 13.

FIG. 19 shows the normal instruction process. In the normal instruction process, a first instruction in the instruction queue constructed as FIFO is first fetched (step S41) and whether execution of the instruction is completed before a next timer interruption occurs or not is determined (step S42). If it is determined in the step S42 that execution of the instruction is completed before a next timer interruption occurs, the first instruction in the instruction queue is executed (step S43). That is, in the step S43, it is connected to the initiator side and data transfer is effected. Next, the first instruction in the FIFO instruction queue is removed (step S44) and the process returns to the idle routine of FIG. 13. Further, if it is determined in the step S42 that execution of the instruction is not completed before a next timer interruption occurs, the process immediately returns to the idle routine of FIG. 13 without executing the normal instruction.

The above-described process in the disk controller 2 of the system is summarized as follows.

The normal instructions which are not required for assuring the deadline are registered into the FIFO instruction queue in the RAM and sequentially executed. In the data stream transfer instruction for assuring the deadline, information such as the transfer period and the transfer size for one cycle or block is first transmitted together with the transfer request from the initiator side to the disk controller 2 before transferring the stream and the disk controller 2 side feeds back an AD for the transfer request to the initiator side if the transfer request is acceptable. After this, the initiator side makes access to the disk controller 2 by use of the AD. The disk controller 2 side holds information such as the instruction queue, transfer period and transfer size for one cycle for each AD and sets timer interruption links based on the transfer period. The timer interruption links are arranged in time order. If the timer interruption occurs, a preset user instruction or an internal control instruction for the disk such as calibration is executed based on information such as AD and priority, and the first entry of the link is removed and the timer interruption for the next entry is set and the timer interrupting process is ended.

Thus, at the time of transfer between the initiator and the disk controller 2, the deadline assurance for the data transfer can be attained by setting the transfer condition prior to the data transfer, integrally managing the data stream transmitting request and disk control request, adequately scheduling the data stream transfer based on the transfer condition and then effecting the data transfer.

Second Embodiment:

A control device for a secondary storage according to the second embodiment of this invention is explained with reference to FIGS. 20 and 21.

Figure 20:
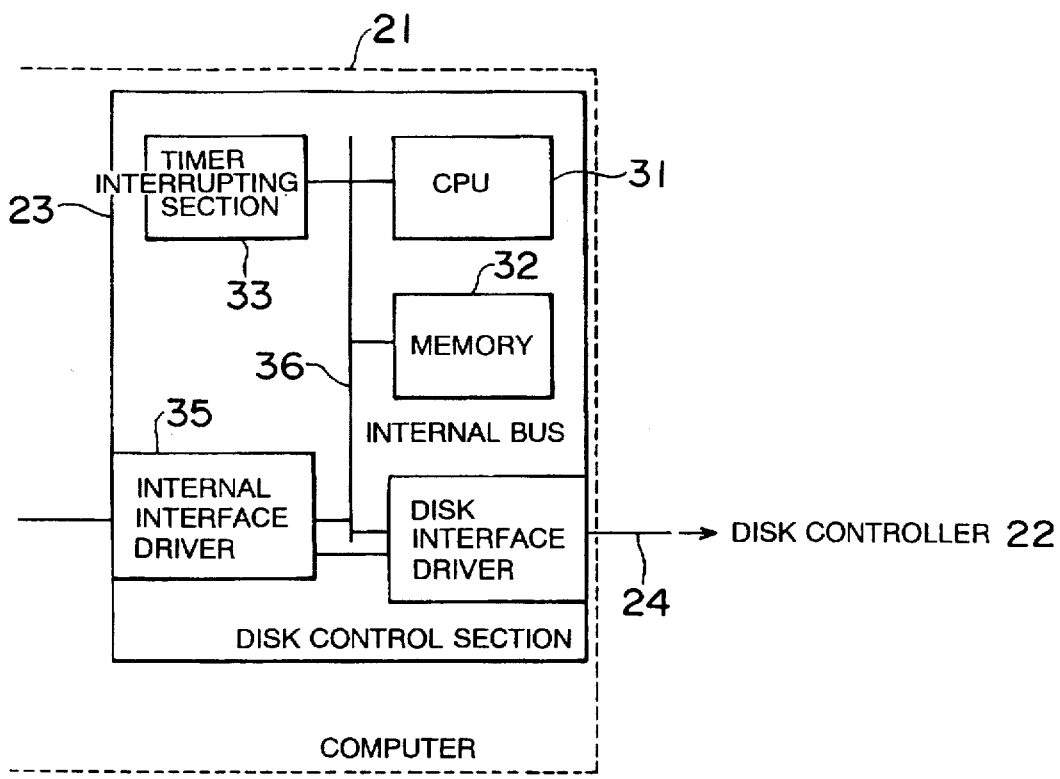
FIG. 20 is a block diagram showing the construction of a control device for a secondary storage according to a second embodiment of this invention.
Figure 21:
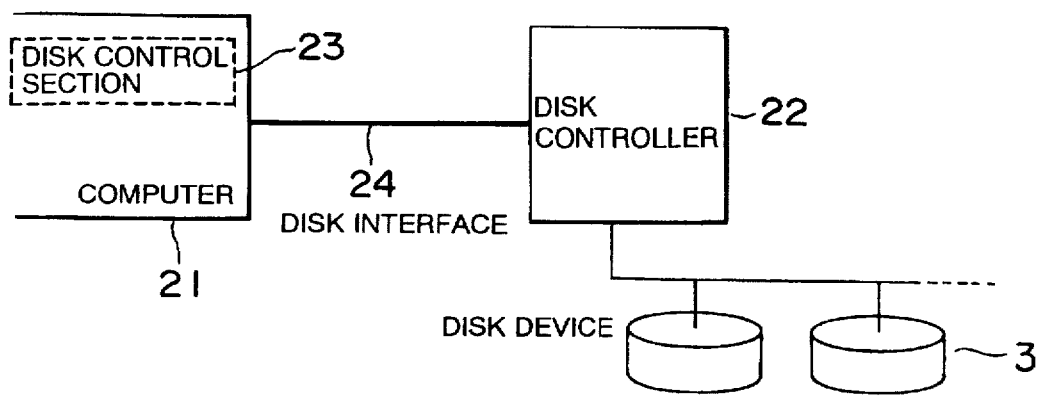
FIG. 21 is a system block diagram showing the construction of a file system using the control device for the secondary storage shown in FIG. 20.

FIG. 20 shows a disk control section contained in a computer to which this invention is applied and the construction of a file system using the disk control section is shown in FIG. 21.

The file system of FIG. 21 includes a computer 21, disk controller 22 and disk device 3. Further, the computer 21 contains a disk control section 23 according to this invention.

The disk device 3 is, for example, a hard disk device which is substantially the same as that shown in FIG. 2 and can store, for example, file data by writing the file data into a magnetic disk which is a storage medium and read out the file data from the disk to use the same.

The computer 21 has a function as an initiator for making access to the disk device 3 and effects data transfer with respect to the disk device 3 to effect the reading/writing operation for the disk device 3. In this embodiment, the control device for the secondary storage according to this invention is incorporated into the computer 21 as the disk control section 23. That is, in this case, the main portion of the computer 21 is substantially an initiator and the disk control section 23 is disposed between the initiator section of the computer 21 and the disk device 3.

The disk controller 22 is connected to the disk device 3 and controls the access operation for the reading/writing operation of the disk device 3 according to the control of the computer 21.

The computer 21 is connected to the disk controller 22 via a disk interface 24 containing a cable from the internal disk control section 23 to make access to the disk device 3 via the disk controller 22.

The disk controller 22 has substantially the same construction as the main portion of the disk controller 2 of FIG. 2 including a portion for scheduling the data stream transfer. Therefore, the disk controller 22 of FIG. 21 has the same construction as a portion of the disk controller 2 of FIG. 2 except a portion for scheduling the data stream transfer and effecting the access operation for the reading/writing operation, that is, only a portion for directly controlling the operation of the disk device 3.

The detail of the disk control section 23 is shown in FIG. 20. The disk control section 23 includes a CPU (central processing unit) 31, memory 32, timer interrupting section 33, disk interface driver 34 and internal interface driver 35. The CPU (central processing unit) 31, memory 32, timer interrupting section 33, disk interface driver 34 and internal interface driver 35 are substantially the same as the CPU 11, memory 12, timer interrupting section 13, disk interface driver 14 and internal interface driver 15 shown in FIG. 1, respectively.

The CPU 31 is formed of a microprocessor, for example, and controls the whole portion of the disk control section 23.

The memory 32 includes a ROM and a RAM, and stores data and programs necessary for the operation of the CPU 31 for controlling the disk device 3. That is, in the ROM, a program for setting the transfer timing and transfer size of the data stream in the data transfer at the time of reading/writing and a program for effecting the data transfer according to the thus set transfer timing and transfer size of the data stream are stored as firmware. The CPU 31 sets the transfer timing and transfer size according to the above programs and controls the reading/writing operation of the disk device 3 according to the transfer timing and transfer size. In the RAM, data for the reading/writing process of the disk device 3 according to the transfer timing and transfer size is stored.

The timer interrupting section 33 generates an interruption to the CPU 31 according to the set transfer timing and effects the timing control for transferring the data stream of preset transfer size.

The memory 32 and timer interrupting section 33 are connected to the CPU 31 via a common internal bus 36.

The disk interface driver 34 is a device driver which is connected to the internal bus 36 and drives the disk interface 24 between it and the disk controller 22. Communication, for example, data transfer between the disk controller 22 and the computer 21 is effected via the disk interface driver 34 and disk interface 24.

The internal interface driver 35 is a device driver which is connected to the internal bus 36 and disk interface driver 34 and drives an interface with respect to the other portion in the computer 21. Communication, for example, data transfer between the computer 21 and the disk device 3 is effected via the internal interface driver 35 and the disk interface driver 34 and disk controller 22.

That is, in the ROM of the memory 32, a program for internal control for temperature compensation, calibration and the like of the disk device 3 and a program for scheduling the transfer timing and transfer size and effecting the transfer control of data stream between the computer 1 and the disk device 3 according to the scheduling are stored as firmware. The CPU 31 effects the internal control of the disk device 3 and the data transfer between the computer 21 and the disk device 3 by controlling the timer interrupting section 33, disk interface driver 34 and internal interface driver 35 according to the above programs stored as firmware in the memory 32. The timer interrupting section 33 makes it possible to effect the data transfer according to the scheduling by previously setting the interruption timing by the CPU 31 and generating an interruption according to the thus set timing.

Although not shown in the drawing, the disk controller 22 has a CPU and a memory, for example, stores a program for controlling the disk and head of the disk device 3, and controls the operation of the disk device 3 in response to a control signal from the disk control section 23 of the computer 21 according to the program.

Data transfer in the disk control section 23 of the system is effected in substantially the same manner as in the case of the system of FIGS. 1 and 2. Also, the concrete operation in the system shown in FIGS. 20 and 21 is substantially the same as that explained with reference to FIGS. 4 to 19 since the disk control section 23 is operated in substantially the same manner as the disk controller 2 of FIG. 1 except that the initiator is an initiator portion of the computer 21 and the disk controller 22 is disposed between it and the disk device 3 on the device side.

Therefore, the process in the disk control section 23 in the computer 21 of the system is summarized as follows.

The normal instructions which are not required for assuring the deadline are registered into the FIFO instruction queue in the RAM of the memory 32 and sequentially executed. In the data stream transfer instruction for assuring the deadline, information such as the transfer period and the transfer size for one cycle or block is first transmitted together with the transfer request from the initiator side to the disk control section 23 before transferring the stream and the disk control section 23 side feeds back an AD for the transfer request to the initiator side if the transfer request is acceptable. After this, the initiator side makes access to the disk control section 23 by use of the AD. The disk control section 23 side holds information such as the instruction queue, transfer period and transfer size for one cycle for each AD and sets timer interruption links based on the transfer period. The timer interruption links are arranged in time order. If the timer interruption occurs, a preset user instruction or an internal control instruction for the disk such as calibration is executed via the disk controller 22 based on information such as AD and priority, and the first entry of the link is removed and the timer interruption for the next entry is set and the timer interruption process is ended.

Thus, at the time of transfer between the initiator and the disk device 3, the deadline assurance for the data transfer can be attained in the disk control section 23 by setting the transfer condition prior to the data transfer, integrally managing the data stream transmission request and disk control request, adequately scheduling the data stream transfer based on the transfer condition and then effecting the data transfer.

Third Embodiment:

A control device for a secondary storage according to the third embodiment of this invention is explained with reference to FIGS. 22 and 23.

Figure 22:
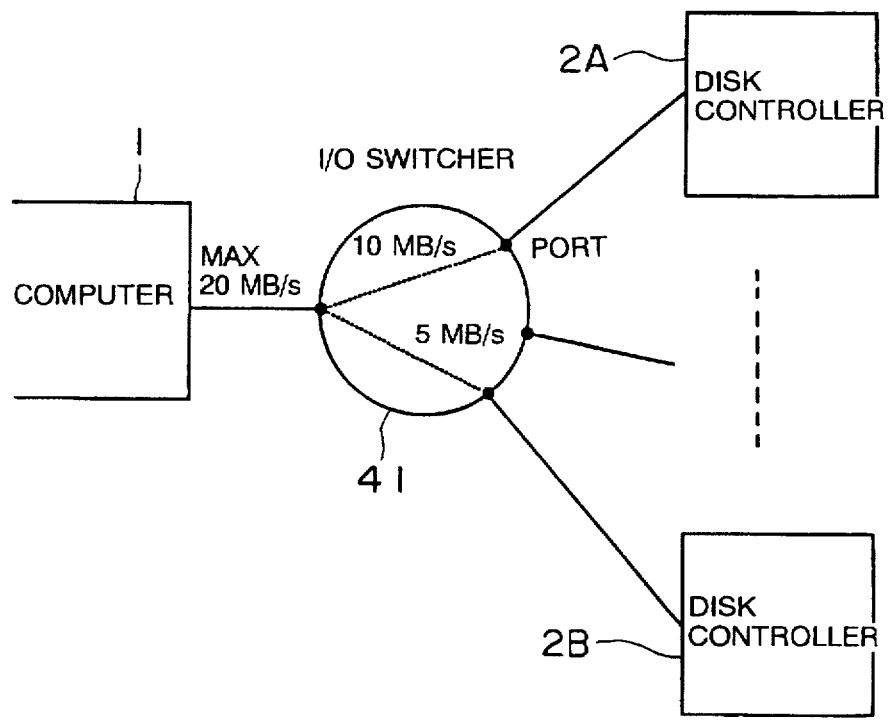
FIG. 22 is a system block diagram showing the construction of a control system for a secondary storage according to a third embodiment of this invention.

FIG. 22 shows a system in which this invention is applied to a system utilizing a plurality of disk devices for the computer 1 and an I/O switcher (input/output switcher) 41 is disposed between the computer 1 and a plurality of disk controllers 2A, 2B. Although not shown in the drawing, disk devices which are the same as the disk device 3 in FIG. 2 are connected to the respective disk controllers 2A, 2B. FIG. 23 shows the concrete construction of the I/O switcher 41. The I/O switcher 41 of FIG. 23 has FIFO (first-in first-out) buffers 42, 43, 44, switch 45 and scheduler 46. In FIGS. 22 and 23, only two disk controllers 2A, 2B are shown, but in general, a larger number of disk controllers are connected.

In the system of FIG. 22, the computer 1 is the same as that of FIG. 2 and each of the disk controllers 2A and 2B is the same as the disk controller shown in FIGS. 1 and 2. The I/O switcher 41 selectively connects the disk controllers 2A, 2B to the computer 1 according to the request of the computer 1 and permits the computer 1 to make access to a corresponding disk device. In this case, it is supposed that the maximum transfer rate permitted between the computer 1 and the I/O switcher 41 is set to 20 MB/s.

Figure 23:
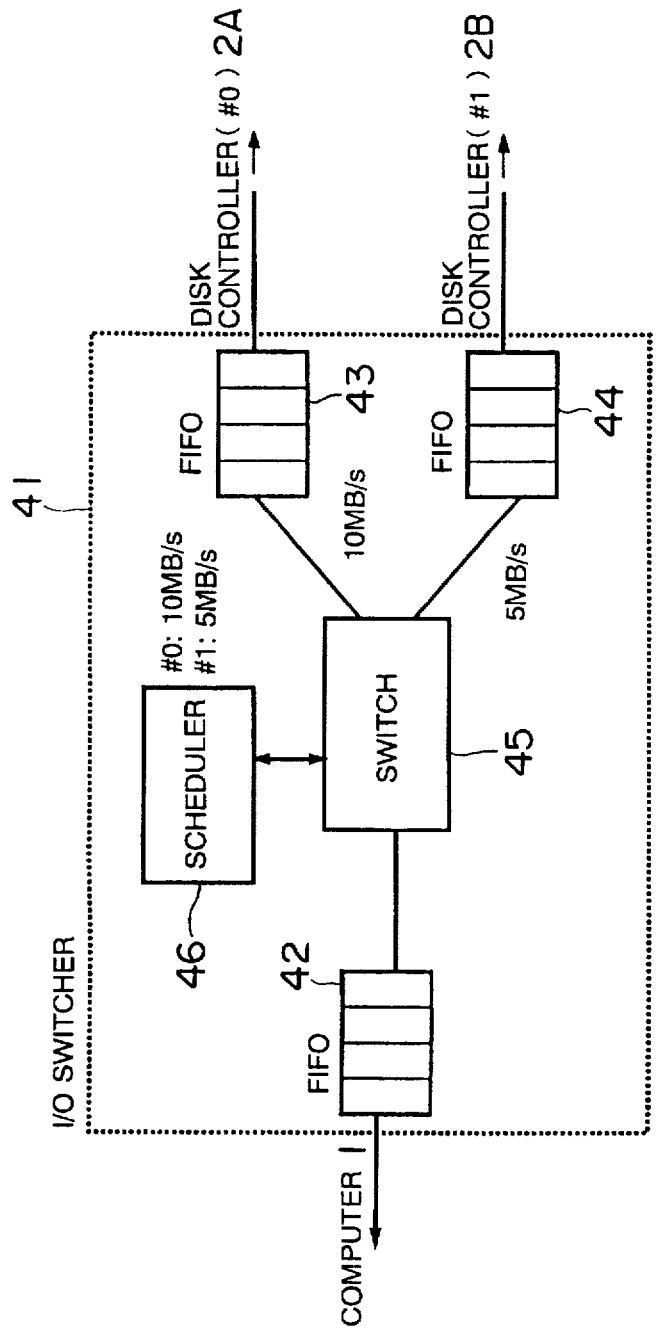
FIG. 23 is a block diagram showing the construction of an I/O switcher in the control system for the secondary storage shown in FIG. 22.

In the I/O switcher 41 of FIG. 23, the first FIFO buffer 42 provided in the first port is connected to the computer 1, the second FIFO buffer 43 provided in the second port is connected to the disk controller (#0) 2A, and the third FIFO buffer 44 provided in the third port is connected to the disk controller (#1) 2B. The switch 45 selects one of the second and third FIFO buffers 43 and 44 to connect the second or third port to the first FIFO buffer 42.

The scheduler 46 previously holds the allowable transfer rates for the respective ports and switches the ports according to the transfer rates and transfer schedules of the disk devices connected to the respective ports at the time of selection control of the switch 45. That is, if a request of transfer from the computer 1 which is an initiator to the disk device, for example, the disk device connected to the disk controller (#0) 2A is issued, the I/O switcher 41 gives the transfer request to the disk controller (#0) 2A via the switch 45 and supplies the acknowledgement (ack) from the disk controller (#0) 2A to the computer 1. At this time, the scheduler 46 fetches the request content from the computer 1 and sets the switching schedule of the switch 45 according to the transfer schedule for the disk controller (#0) 2A.

Likewise, if a request of transfer from the computer 1 to the disk device, for example, the disk device connected to the disk controller (#1) 2B is issued, the I/O switcher 41 gives the transfer request to the disk controller (#1) 2B via the switch 45 and supplies the acknowledgement (ack) from the disk controller (#1) 2B to the computer 1. At this time, the scheduler 46 fetches the request content from the computer 1 and sets the switching schedule of the switch 45 according to the transfer schedule for the disk controller (#1) 2B.

If the transfer rate for the disk controller (#0) 2A is 10 MB/s and the transfer rate for the disk controller (#1) 2B is 5 MB/s, even the total sum of the above transfer rates is smaller than the maximum transfer rate 20 MB/s allowable between the computer 1 and the I/O switcher 41 so that the computer 1 can make access to both of the disk controller (#0) 2A and the disk controller (#1) 2B. Therefore, the scheduler 46 previously sets the schedule of switching by the switch 45 for both of the disk controller (#0) 2A and the disk controller (#1) 2B according to the allowable transfer rates of the respective ports and operates the switch 45 according to the schedule.

Therefore, since the computer 1 is connected to a corresponding disk controller at the timing of communication such as data transfer with respect to the computer 1 in either the disk controller (#0) 2A or the disk controller (#1) 2B, the same transfer control as explained with reference to FIGS. 4 to 19 is effected without recognizing the presence of the switch 45 and scheduler 46 from each of the disk controller (#0) 2A and the disk controller (#1) 2B. The FIFO buffers 42 to 44 function as buffers for preventing omission of data even when the timings in the respective ports are slightly deviated.

In the system thus using the I/O switcher 41, the scheduler 46 is present in the system, the scheduler 46 holds information of the allowable transfer rates, that is, the band widths to be assured of the respective ports, controls the switch 45 based on the information and assures the transfer of the least data amount (the number of packets in the case of fixed length packets) for each unit time according to the preset transfer rate.

It is apparent that, in this invention, a wide range of different working modes can be formed based on the invention without deviating from the spirit and scope of the invention.

What is claimed is:

1. A control device for a secondary storage comprising:

condition setting means for setting transfer timing and transfer size of a data stream in a data transfer request to be assured bandwidth issued from an initiator prior to data transfer of the data stream between the initiator and the secondary storage;

queuing means for queuing an instruction other than the data transfer request;

data transferring means for effecting the data transfer between the initiator and the secondary storage according to the transfer timing and transfer size of the data stream and effecting the operation of reading/writing data of the secondary storage; and executing means for executing the instruction queued by said queuing means when the instruction can be performed without interfering with the data transfer request to be assured bandwidth.

2. A device according to claim 1, wherein said condition setting means is means for setting the transfer interval and transfer stream size for one transfer cycle for intermittently transferring the data stream.

3. A device according to claim 1, wherein said condition setting means includes condition controlling means for setting the transfer timing and transfer size of the data stream in the data transfer based on the transfer condition given from the initiator.

4. A device according to claim 3, wherein said condition setting means is means for setting the transfer interval and transfer stream size for one transfer cycle for intermittently transferring the data stream.

5. A device according to claim 1, wherein said condition setting means is means for effecting the scheduling for the transfer timings and transfer sizes of a plurality of data streams.

6. A device according to claim 3, wherein said condition setting means includes condition controlling means for setting the transfer timings and transfer sizes of data streams in a plurality of data transfers based on the transfer conditions defined by a plurality of transfer requests supplied from the initiator.

7. A device according to claim 3, further comprising informing means for informing the initiator that the transfer band width of the data stream to be transferred cannot be assured when the transfer band width cannot be assured and avoiding the data transfer.

8. A device according to claim 3, wherein said condition setting means includes condition controlling means for setting the transfer timing and transfer size of the data stream in the data transfer only for a transfer request for which the transfer band width can be assured based on the transfer condition defined by a plurality of transfer requests supplied from the initiator.

9. A device according to claim 3, wherein said condition setting means includes process controlling means which has internal process setting means for setting a period in which the internal process of the secondary storage is effected in a period other than the transfer period of the data transfer and which causes the internal process to be effected according to the setting by said internal process setting means.

10. A device according to claim 3, wherein said condition setting means is means for setting a transfer period of the data transfer for which the transfer band width is not required to be assured in a period other than the transfer period of the data transfer for which the transfer band width is required to be assured based on the transfer condition given from the initiator.

11. A device according to claim 9, wherein the secondary storage is a disk device and the internal process set by said internal process setting means contains at least one of the calibration process for calibration of the disk head position and the temperature compensating process for preventing occurrence of abnormal temperature.

12. A device according to any one of claims 1 to 10, wherein the device is provided on the secondary storage side.

13. A device according to any one of claims 1 to 10, wherein the device is provided in the device of the initiator.

14. A control system for a secondary storage comprising:

a plurality of secondary storages;

an initiator for making accesses to said plurality of secondary storages;

control sections for said secondary storages respectively provided for said secondary storages and each including condition setting means for setting the transfer timing and transfer size of a data stream in a data transfer request to be assured bandwidth issued from the initiator for data transfer of the data stream between the initiator and at least one of said secondary storages based on the transfer condition given from the initiator;

queuing means for queuing an instruction other than the data transfer request;

data transferring means for effecting the data transfer between the initiator and said at least one of said secondary storages according to the transfer timing and transfer size of the data stream and effecting the operation of reading/writing data of said at least one of said secondary storages;

a selective connection device disposed between the initiator and said control sections for said plurality of secondary storages, for selectively switching and connecting said control sections for said plurality of secondary storages to the initiator and controlling the selective switching of said control sections for said plurality of secondary storages to satisfy the transfer condition given from the initiator; and executing means for executing the instruction queued by said queuing means when the instruction can be performed without interfering with the data transfer request to be assured bandwidth.

15. A system according to claim 14, wherein said selective connection device includes band width assuring means for assuring the band width of data transfer between connection ports based on the transfer condition given from the initiator.

16. A system according to claim 15, wherein said band width assuring means includes a scheduler for controlling the schedule for selective switching of said control sections for said secondary storages based on the transfer condition given from the initiator.

* * * * *